(12) United States Patent
Okada

(10) Patent No.: US 7,398,409 B2
(45) Date of Patent: Jul. 8, 2008

(54) SEMICONDUCTOR INTEGRATED CIRCUIT AND ITS POWER-SAVING CONTROL METHOD AND PROGRAM

(75) Inventor: Takeyuki Okada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 360 days.

(21) Appl. No.: 11/057,225

(22) Filed: Feb. 15, 2005

(65) Prior Publication Data
US 2006/0047988 A1 Mar. 2, 2006

(30) Foreign Application Priority Data
Aug. 25, 2004 (JP) ............................. 2004-245217

(51) Int. Cl.
G06F 1/00 (2006.01)
(52) U.S. Cl. ...................... 713/323; 713/300; 713/322; 713/324
(58) Field of Classification Search ................. 713/320, 713/322, 323, 324, 340
See application file for complete search history.

(56) References Cited

U.S. PATENT DOCUMENTS

| | | | | |
|---|---|---|---|---|
| 5,951,689 A | * | 9/1999 | Evoy et al. ................... | 713/322 |
| 6,886,105 B2 | * | 4/2005 | Kahn et al. ................... | 713/323 |
| 7,278,040 B2 | * | 10/2007 | Gaskins et al. ............... | 713/322 |
| 2003/0061383 A1 | * | 3/2003 | Zilka ........................... | 709/245 |
| 2003/0177404 A1 | * | 9/2003 | Jorgenson et al. ........... | 713/300 |
| 2005/0076256 A1 | * | 4/2005 | Fleck et al. .................. | 713/320 |

FOREIGN PATENT DOCUMENTS

JP    A-2001-184495    7/2001

* cited by examiner

*Primary Examiner*—Rehana Perveen
*Assistant Examiner*—Michael J Brown
(74) *Attorney, Agent, or Firm*—Oliff & Berridge, PLC

(57) ABSTRACT

A semiconductor integrated circuit having plural functional block circuits that are controlled by a system clock to an operation state in an ordinary mode and to a deactivated state in a power-saving mode, the semiconductor integrated circuit comprising: a power-saving mode signal generation unit which generates a power-saving mode signal that instructs to shift from the ordinary mode to the power-saving mode; and a power-saving control unit which controls to make clock enable signals, which make the system clock to the plural functional block circuits valid, inactive individually and sequentially with prescribed time intervals at the time when the power-saving mode signal generated by the power-saving mode signal generation unit becomes active.

3 Claims, 3 Drawing Sheets

SEMICONDUCTOR INTEGRATED CIRCUIT AND ITS POWER-SAVING CONTROL METHOD AND PROGRAM

BACKGROUND OF THE INVENTION

1. Field of the Invention

The present invention relates to a semiconductor integrated circuit of which operation is controlled according to input of a system clock, and more particularly to a semiconductor integrated circuit, which prevents a sharp change in power-supply voltage, and its power-saving control method and power-saving control program.

2. Description of the Related Art

In recent years, it is significant for various types of OA (Office Automation) equipment not to waste energy. Therefore, the OA equipment is provided with a power-saving mode or the like, and when it is not used for a prescribed time, the functions of portions other than necessary minimum portions stop operating so as to fall in a power-saving state, thereby preventing unnecessary power consumption.

A power-saving technology of the above-described type is disclosed in, for example, Japanese Patent Application Laid-Open No. 2001-184495 entitled, "Image processing device".

The invention of the Japanese Patent Application Laid-Open No. 2001-184495 covers a technology that power consumption can be decreased by independently controlling to stop a clock signal for individual portions when they are in a standby mode or the like and not required.

The invention of the Japanese Patent Application Laid-Open No. 2001-184495 describes that the individual portions can be stopped by independently controlling, but there is a possibility of causing a malfunction if a power-supply voltage drops sharply even if the stop control is executed independently.

According to the prior art, unnecessary power consumption was prevented by simultaneously activating and stopping the system clock for all large-scale functional blocks. Therefore, there was a problem that an abnormal voltage was produced on a power-supply voltage line to deteriorate the quality of the semiconductor integrated circuit because of switching current of a large number of transistors. There was also a problem that a malfunction was apt to occur because of a drop in power-supply voltage.

The present invention has been made in view of the above circumstances and provides a semiconductor integrated circuit, which is divided into prescribed types of functional blocks so as to activate and stop a system clock with prescribed time intervals for the individual divided blocks, and its power-saving control method and power-saving control program.

SUMMARY OF THE INVENTION

An aspect of the present invention provides a semiconductor integrated circuit having plural functional block circuits that are controlled by a system clock to an operation state in an ordinary mode and to a deactivated state in a power-saving mode, the semiconductor integrated circuit comprising: a power-saving mode signal generation unit which generates a power-saving mode signal that instructs to shift from the ordinary mode to the power-saving mode; and a power-saving control unit which controls to make clock enable signals, which make the system clock to the plural functional block circuits valid, inactive individually and sequentially with prescribed time intervals at the time when the power-saving mode signal generated by the power-saving mode signal generation unit becomes active.

A further aspect of the present invention provides a power-saving control method of a semiconductor integrated circuit whose operation is controlled by a system clock, comprising: dividing a group of functions, which are controlled to an operation state in an ordinary mode and to a deactivated state in a power-saving mode, into plural functional block circuits; generating a power-saving mode signal, which instructs to shift from the ordinary mode to the power-saving mode, by a power-saving mode signal generation unit; controlling to make clock enable signals, which make the system clock to the plural functional block circuits valid, inactive individually and sequentially with prescribed time intervals at the time when the power-saving mode signal generated by the power-saving mode signal generation unit becomes active; and controlling to make the clock enable signals active individually and sequentially with prescribed time intervals at the time when the power-saving mode signal generated by the power-saving mode signal generation unit becomes inactive.

A still further aspect of the present invention provides a power-saving control program which makes a computer to execute a processing of a semiconductor integrated circuit whose operation is controlled by a system clock, comprising: a first step of dividing a group of functions, which are controlled to an operation state in an ordinary mode and to a deactivated state in a power-saving mode, into plural functional block circuits; a second step of generating a power-saving mode signal which instructs to shift from the ordinary mode to the power-saving mode; a third step of controlling to make clock enable signals, which make the system clock to the plural functional block circuits valid, inactive individually and sequentially with prescribed time intervals at the time when the power-saving mode signal generated in the second step becomes active; and a fourth step of controlling to make the clock enable signals active individually and sequentially with prescribed time intervals at the time when the power-saving mode signal generated in the second step becomes inactive.

According to the present invention, it is configured such that the semiconductor integrated circuit is divided into prescribed types of functional blocks and the system clock is activated and stopped sequentially for each of the divided functional blocks with prescribed time intervals. Thus, the sharp change of a power-supply voltage can be controlled, and degradation in quality and malfunction involved can be avoided.

BRIEF DESCRIPTION OF THE DRAWINGS

Embodiments of the present invention will be described in detail based on the following figures, wherein.

DETAILED DESCRIPTION OF THE INVENTION

An example of the semiconductor integrated circuit and its power-saving control method and power-saving control program according to the present invention will be described in detail with reference to the accompanying drawings.

Figure 1:
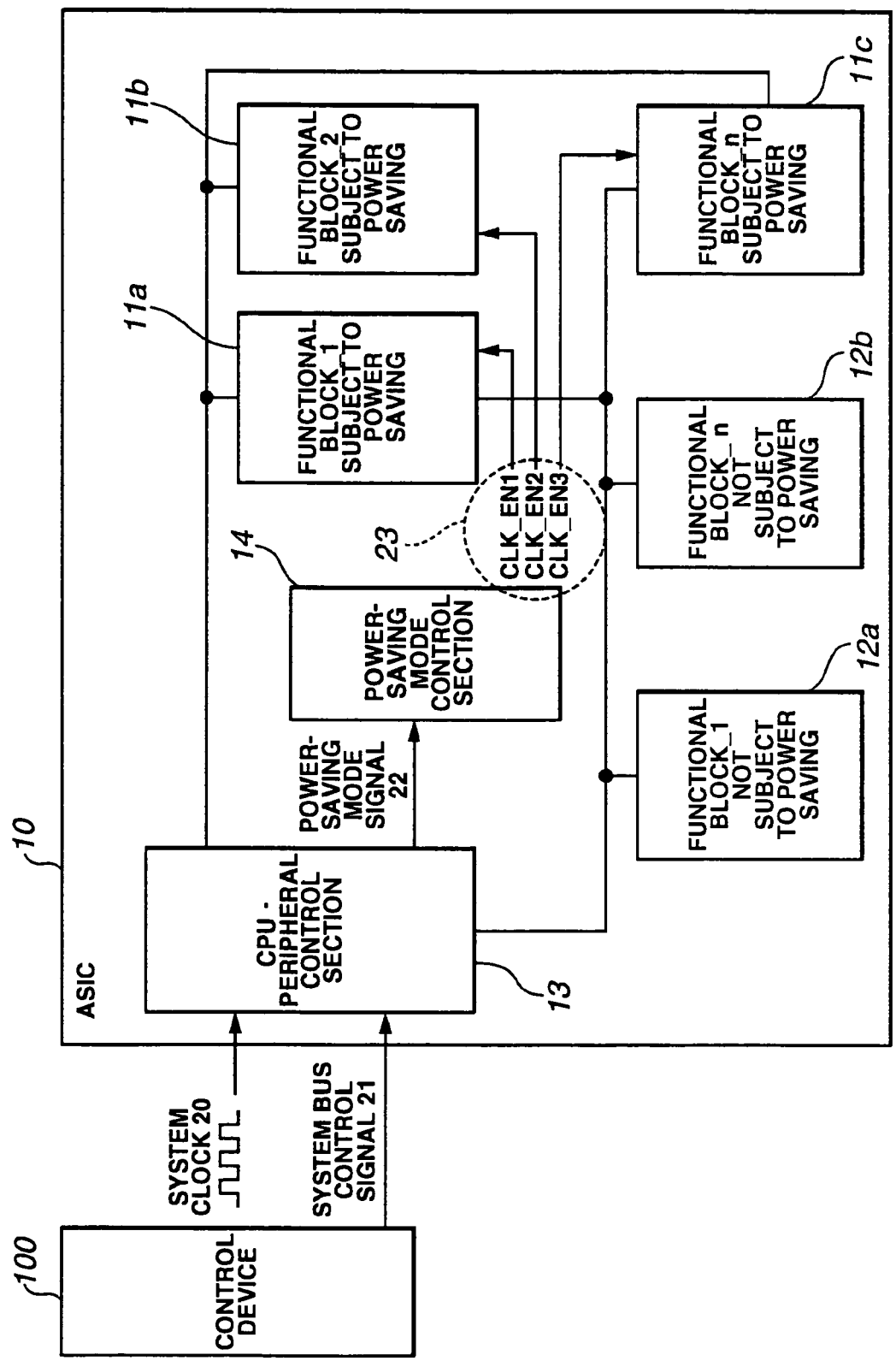
FIG. 1 is a view showing a schematic structure of ASIC 10 to which the semiconductor integrated circuit according to the present invention is applied.

FIG. 1 is a view showing a schematic structure of the ASIC 10 to which the semiconductor integrated circuit according to the present invention is applied. Here, only the components according to the present invention will be described.

FIG. 1 shows the ASIC 10 and a control device 100 for controlling the ASIC 10.

The control device 100 is a control device such as a CPU and sends a control signal to the ASIC 10 to control it. Specifically, it transmits a system clock 20, which is a basic clock for operating the functions provided for the ASIC 10 and a system bus control signal 21 which is a group of signals for controlling an address bus for controlling the function provided for the ASIC 10, a data bus and a system bus for a control signal and the like, to the ASIC 10.

The ASIC 10 is comprised of a CPU peripheral control section 13, a power-saving mode control section 14, functional blocks 11 (11a, 11b, 11c) subject to power saving and functional blocks 12 (12a, 12b) not subject to power saving as various processing functional sections.

The CPU peripheral control section 13 is controlled by the system clock 20 and the system bus control signals 21 output from the above-described control device 100 to perform a system operation as the interface section with an external device such as a CPU. For example, it performs ordinary system operations such as analysis of a CPU command, control of an interrupt signal and the like.

Based on the received system bus control signal 21, the CPU peripheral control section 13 generates a power-saving mode signal 22 for instructing whether the functional blocks 11 subject to power saving to be described later are made to fall in a deactivated state (power-saving mode) or in an ordinary mode, which is an intrinsic operating state. This power-saving mode signal 22 is transmitted to the power-saving mode control section 14.

The power-saving mode control section 14 shifts the individual functional blocks 11 subject to power saving for realizing various processing functions to a power-saving mode or an ordinary mode with prescribed time intervals. Specifically, the power-saving mode control section 14 receives the power-saving mode signal 22 from the CPU peripheral control section 13 and generates clock enable signals 23 (CLK_EN1 to CLK_EN3) and transmits the clock enable signals 23 to the functional blocks 11 subject to power saving every cycle of the system clock 20. The functional blocks 11 subject to power saving which have received the clock enable signals 23 shift sequentially to the power-saving state or the ordinary operating state. Thus, a sharp change in power-supply voltage can be prevented by transmitting the clock enable signals 23 with prescribed time intervals. Therefore, degradation in quality and malfunction can be prevented from occurring.

The functional blocks 11 subject to power saving are processing functional sections which do not perform a circuit operation according to the system clock 20 at the time of shifting to the power-saving mode but falls in a function-disabled state until the shift to the ordinary mode is completed. In other words, not all the functions stop even in the state that the ASIC 10 has shifted to the power-saving mode, but the functional blocks 11 subject to power saving fall in a function-disabled state. Meanwhile, the processing functional sections, which maintain the original operating state even in the power-saving mode, are the functional blocks 12 not subject to power saving to be described later.

The individual functional blocks 11 (11a, 11b, 11c) subject to power saving are divided into appropriate circuit scales considering an operation frequency of the system clock 20 and a design rule of a production process of the ASIC 10 and realize various functions requiring the system clock 20 as a basic input signal. For example, the functional block_1 (11a) subject to power saving corresponds to a processing section which is comprised of SDRAM (Synchronous Dynamic Random Access Memory) I/F (Interface) and a group of bus control type functions relevant to the SDRAM I/F terminal and the like, the functional block_2 (11b) subject to power saving corresponds to a processing section which is comprised of band control and a group of expansion type functions such as band control, video DMA (Direct Memory Access) and the like, and the functional block_n (11c) subject to power saving corresponds to a processing section which is comprised of a group of compression path type functions such as synchronization FIFO (First-In First-Out), code DMA and the like.

Meanwhile, the functional blocks 12 not subject to power saving are processing functional sections which operate in the same way as in the ordinary mode even if the mode is changed to the power-saving mode. For example, the functional block_1 (12a) not subject to power saving corresponds to a processing section comprising a Net I/F which responds to an inquiry from a network and waits for a job, and the functional block_n (12b) not subject to power saving corresponds to a processing section which controls an interrupt processing such as a user instruction or the like.

Transmission timing of the clock enable signals 23 will be described with reference to FIG. 2.

Figure 2:
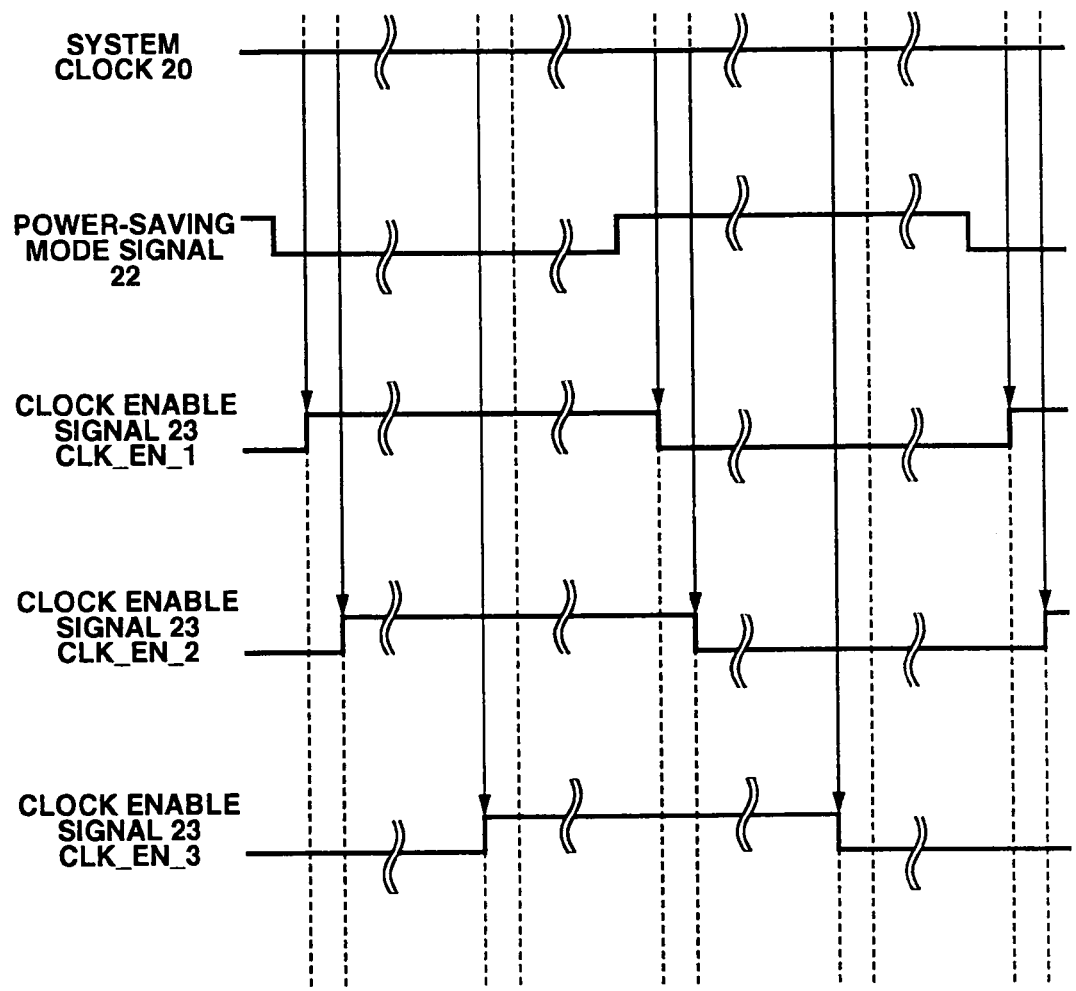
FIG. 2 is a timing chart illustrating transmission timing of clock enable signals 23 shown in FIG. 2.

FIG. 2 shows a timing chart of the power-saving mode control section 14 which sends the clock enable signals 23 to the functional blocks 11 subject to power saving.

The clock enable signals 23 are generated by the power-saving mode control section 14 when the power-saving mode signal 22 is received from the CPU peripheral control section 13. Here, the clock enable signal 23 transmitted from the power-saving mode control section 14 to the functional block_1 (11a) subject to power saving is determined as CLK_EN1, the clock enable signal 23 transmitted from the power-saving mode control section 14 to the functional block_2 (11b) subject to power saving is determined as CLK_EN2, and the clock enable signal 23 transmitted to the functional block_n (11c) in the same way is determined as CLK_ENn.

When the power-saving mode signal 22 is active and transmitted from the CPU peripheral control section 13 to the power-saving mode control section 14, the power-saving mode control section 14 transmits the clock enable signals 23 (CLK_EN1 to CLK_EN3) as inactive to the functional blocks 11 subject to power saving. Meanwhile, when the power-saving mode signal 22 is inactive and transmitted from the CPU peripheral control section 13 to the power-saving mode control section 14, the power-saving mode control section 14 transmits the clock enable signals 23 (CLK_EN1 to CLK_EN3) as active to the functional blocks 11 subject to power saving.

In FIG. 2, when the power-saving mode signal 22 transmitted from the CPU peripheral control section 13 becomes active, the power-saving mode control section 14 makes CLK_EN1 inactive in synchronization with the first system clock 20 and transmits the CLK_EN1 to the functional blocks 11 subject to power saving. Similarly, CLK_ENn is transmitted as inactive in synchronization with the n-th system clock 20.

When the power-saving mode signal 22 transmitted from the CPU peripheral control section 13 becomes inactive, the power-saving mode control section 14 makes CLK_EN1 inactive in synchronization with the first system clock 20 and transmits the CLK_EN1 to the functional blocks subject to power saving. Similarly, CLK_ENn is transmitted as active in synchronization with the n-th system clock 20.

When the individual clock enable signals 23 are input and active, each of the functional blocks 11 subject to power saving gets into the ordinary mode in which the ordinary operation can be made, and when the clock enable signals 23 are inactive, it gets into the power-saving mode in which the ordinary operation is impossible.

Figure 3:
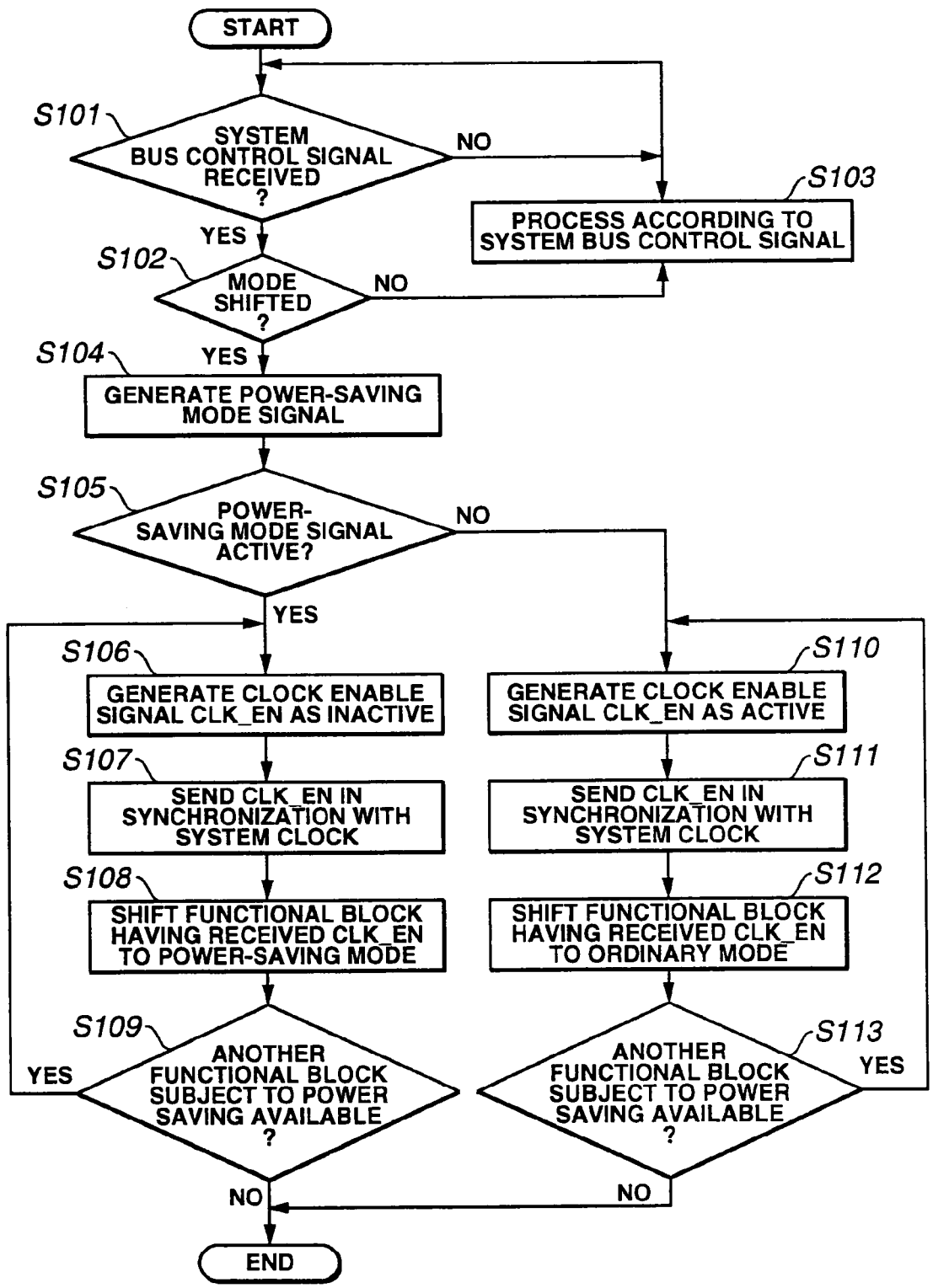
FIG. 3 is a flow chart illustrating an operation of power-saving control processing by the ASIC 10 shown in FIG. 1.

FIG. 3 is a flow chart illustrating the operation of power-saving control processing in the ASIC 10 shown in FIG. 1.

First, the system bus control signal 21 is sent from the control device 100 toward the ASIC 10 and received by the CPU peripheral control section 13, then the power-saving control processing is started (YES in step S101).

The CPU peripheral control section 13 having received the system bus control signal 21 analyzes the system bus control signal 21 and judges whether it is necessary to switch the currently set mode. In other words, it is necessary to shift from the power-saving mode to the ordinary mode to perform the processing according to the received system bus control signal 21. Otherwise, it is judged whether the processing can be made even if the ordinary mode is changed to the power-saving mode.

Here, when it is judged by the CPU peripheral control section 13 that it is not necessary to change the mode (NO in step S 102), a prescribed processing is performed according to the system bus control signal 21. Then, the procedure returns to step S101, the CPU peripheral control section 13 falls in a state of waiting to receive the system bus control signal 21, but when it is judged that it is necessary to shift the mode (YES in step S102), the CPU peripheral control section 13 generates and transmits the power-saving mode signal 22 to the power-saving mode control section 14 (step S104).

The power-saving mode control section 14 having received the power-saving mode signal 22 judges whether the power-saving mode signal 22 is active or inactive (step S105). If it is judged by this judging processing that the power-saving mode signal 22 is active, the functional blocks 11 subject to power saving shift to the power-saving mode by the processing to be described later. Meanwhile, if it is judged as inactive, the functional blocks 11 subject to power saving shift to the ordinary mode by the processing to be described later.

Here, if the power-saving mode signal 22 is active (YES in step S105), the power-saving mode control section 14 generates the clock enable signal CLK_EN as inactive (step S106) and transmits the generated clock enable signal 23 to a specified functional block 11 subject to power saving in synchronization with the system clock output from the control device 100 (step S107). The specified functional block 11 subject to power saving is one of a single or plural functional blocks 11 subject to power saving. The functional block 11 subject to power saving having received the clock enable signal 23 stops the operation and shifts to the power-saving mode (step S108).

And, the power-saving mode control section 14 judges whether there is another functional block 11 subject to power saving (step S109). Specifically, setting information, e.g., a number of functional blocks 11 subject to power saving, is previously registered in the ASIC 10, and the power-saving mode control section 14 judges according to the setting information whether there is a functional block 11 subject to power saving which has not been subjected to the mode shifting processing. The power-saving level can also be controlled depending on a degree of registration of the setting information.

Here, when the functions of all functional blocks 11 subject to power saving are stopped and the shifting to the power saving mode is completed (NO in step S109), the power-saving control processing is terminated, but if there is an operating functional block 11 subject to power saving (YES in step S109), the procedure returns again to step S106, and the same processing from step S106 to step S108 is repeated until the shifting to the power-saving mode is completed.

Meanwhile, if it is judged in step S105 that the power-saving mode signal 22 is inactive (NO in step S105), the power-saving mode control section 14 generates the clock enable signal CLK_EN as active (step S110) and sends the generated clock enable signal 23 to a particular functional block 11 subject to power saving in synchronization with the system clock output from the control device 100 (step S111). The particular functional block 11 subject to power saving is one of the single or plural functional blocks 22 subject to power saving. The functional block 11 subject to power saving having received the clock enable signal 23 restarts the operation and shifts to the ordinary mode which is the intrinsic operating state (step S112).

And, the power-saving mode control section 14 judges whether there is another functional block 11 subject to power saving (step S113). Specifically, setting information, e.g., a number of functional blocks 11 subject to power saving, is previously registered in the ASIC 10, and the power-saving mode control section 14 judges according to the setting information whether there is a functional block 11 subject to power saving which has not been subjected to the mode shifting processing.

Here, if all the functional blocks 11 subject to power saving are restarted to operate and the shifting to the ordinary mode is completed (NO in step S113), the power-saving control processing is terminated, but if there is a functional block 11 subject to power saving of which operation is deactivated (YES in step S113), the procedure returns to step S110, and the processing of step S110 to step S112 is repeated until the shifting to the ordinary mode is completed.

As described above, the present invention does not stop the operations of the individual processing functional sections (functional blocks 11 subject to power saving) which are mounted on the ASIC 10 to shift to the power-saving mode at the same time but is configured to stop the operations of the functional blocks 11 subject to power saving with prescribed time intervals in synchronization with the system clock 20. Thus, a sharp drop in power-supply voltage can be prevented, and a malfunction of the ASIC 10 can be prevented from occurring.

It is also configured to shift to the ordinary mode by restarting the operations of the functional blocks 11 subject to power saving with prescribed time intervals in synchronization with the system clock 20 in the same way as that of shifting to the power-saving mode. Thus, a sharp increase in power-supply voltage can be prevented, and degradation in quality of the ASIC 10 can be prevented from occurring.

In the above-described example, the semiconductor integrated circuit according to the present invention was applied to the ASIC 10, but it may be configured such that the above-described power-saving control processing is executed by a power-saving control program installed in a computer.

It was described in the above example that the power-saving control processing of the present invention is performed to shift to the power-saving mode or the ordinary mode, but it may be configured to apply and conduct the present invention at the time of activating or stopping the system.

Furthermore, the present invention is not limited to the example described above and shown in the drawings, and various modifications may be made without deviating from the spirit and scope of the invention.

The semiconductor integrated circuit and its power-saving control method and power-saving control program according to the present invention can be applied to a general semiconductor integrated circuit of which operation is controlled according to the input of a system clock and is particularly effective to prevent a degradation in quality and a malfunction due to a sharp change in power-supply voltage caused at the time of shifting to the power-saving mode.

The entire disclosure of Japanese Patent Application No. 2004-245217 filed on Aug. 25, 2004 including specification, claims, drawings and abstract is incorporated herein by reference in its entirety.

What is claimed is:

1. A semiconductor integrated circuit comprising:
a plurality of first functional block circuits that are controlled by a system clock to an operation state in an ordinary mode and to a deactivated state after shifting to a power-saving mode;
one or more second functional block circuits that are controlled by the system clock to the operation state in the ordinary mode and to maintain the operation state after shifting to the power-saving mode;
a power-saving mode signal generation unit which generates a power-saving mode signal that instructs to shift from the ordinary mode to the power-saving mode; and
a power-saving control unit which controls to make clock enable signals to be inputted to each of the plurality of first functional block circuits, which make the system clock valid, inactive sequentially in synchronism with the system clock when the power-saving mode signal generated by the power-saving mode signal generation unit becomes active from inactive, wherein
the power-saving control unit controls includes an ordinary mode returning control unit which controls to make the clock enable signals to be inputted to each of the plurality of first functional block circuits active sequentially in synchronism with the system clock when the power-saving mode signal generated by the power-saving mode signal generation unit becomes inactive from active.

2. A power-saving control method of a semiconductor integrated circuit comprising a plurality of first functional block circuits that are controlled by a system clock to an operation state in an ordinary mode and to a deactivated state after shifting to a power-saving mode; and one or more second functional block circuits that are controlled by the system clock to an operation state in the ordinary mode and to maintain the operation state after shifting to the power-saving mode, the method comprising:
generating a power-saving mode signal which instructs to shift from the ordinary mode to the power-saving mode;
controlling to make clock enable signals to be inputted to each of the plurality of first function block circuits, which make the system clock valid, inactive sequentially in synchronism with the system clock when the power-saving mode signal becomes active from inactive; and
controlling to make the clock enable signals to be inputted to each of the plurality of first functional block circuits active sequentially in synchronism with the system clock when the power-saving mode signal becomes inactive from active.

3. A computer readable medium storing a program causing a computer to execute a process for power-saving control of a semiconductor integrated circuit comprising a plurality of first functional block circuits that are controlled by a system clock to an operation state in an ordinary mode and to a deactivated state after shifting to a power-saving mode, and one or more second functional block circuits that are controlled by the system clock to the operation state in the ordinary mode and to maintain the operation state after shifting to the power-saving mode, the process comprising:
generating a power-saving mode signal which instructs to shift from the ordinary mode to the power-saving mode;
controlling to make clock enable signals to be inputted to each of the plurality of first function block circuits, which make the system clock valid, inactive sequentially in synchronism with the system clock when the power-saving mode signal becomes active from inactive; and
controlling to make the clock enable signals to be inputted to each of the plurality of first functional block circuits active sequentially in synchronism with the system clock when the power-saving mode signal becomes inactive from active.

* * * * *